Patented Dec. 20, 1949

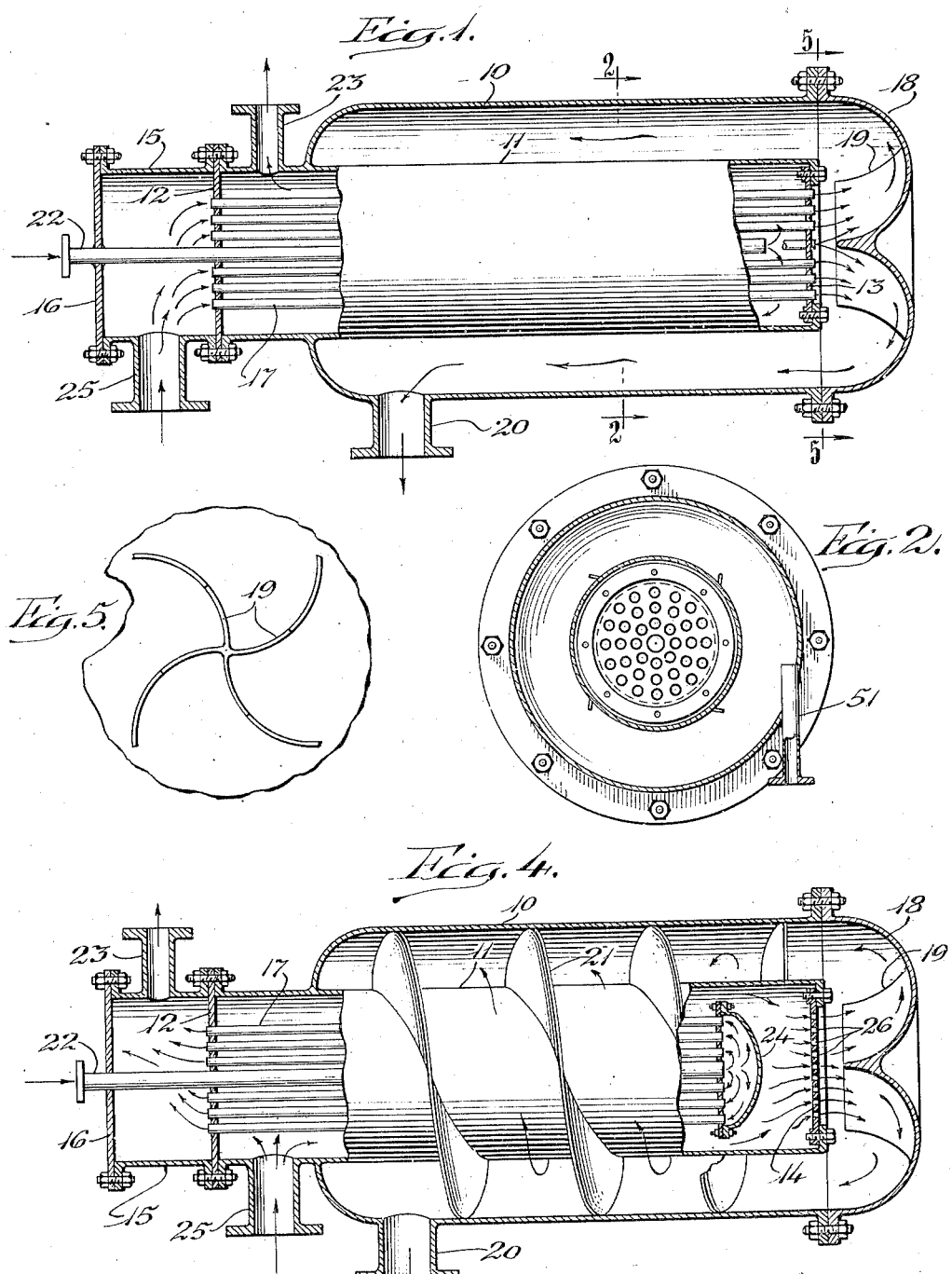

2,491,618

UNITED STATES PATENT OFFICE 2,491,618

CATALYTIC CONTACTING APPARATUS

Edgar J. Luetzelschwab, Highland, Ind., assignor to Standard Oil Company, Chicago, Ill., a corporation of Indiana Application July 30, 1943, Serial No. 496,775

11 Claims. (Cl. 23—285)

This invention relates to catalytic contacting of hydrocarbons in general and more particularly to alkylation of hydrocarbons with olefinic hydrocarbons in the presence of a liquid catalyst such as sulfuric acid, liquid hydrogen fluoride, activated sulfuric acid, fluent metal halide catalysts and the like. More specifically my invention relates to apparatus for carrying out such contacting to effect for example, alkylation, isomerization or polymerization.

Among other variables the successful operation of a liquid catalyst reaction process depends upon obtaining intimate contact between the catalyst and the hydrocarbons to be alkylated and upon maintaining a high isoparaffin to olefin ratio within the contacting zone. The formation of an emulsion of the catalyst and hydrocarbon is a preferred method of effecting the contact and high recycle ratios of unreacted hydrocarbon is a preferred means for maintaining the high isoparaffin to olefin ratio within the contacting zone. It is also desirable, however, that the alkylate shall be separable from the catalyst so that the catalyst may be recycled to contact additional unreacted hydrocarbons.

One of the objects of my invention is to provide an improved apparatus for isoparaffin-olefin alkylation wherein means is provided for effecting the desired time of contact with a minimum separation of hydrocarbon and catalyst within the contacting zone. Another object is to provide a reactor having no internal driven impellers or other internal mechanical moving parts. Another object is to provide an apparatus wherein shorter external pumping lines are required. A further object is to provide a reactor wherein the heat exchangers or chillers are within the reaction drums and the reacting materials are substantially constantly in contact with the chilling means. Another object is to provide an arrangement of a reactor, a chiller and circulation equipment which is more efficient than that heretofore known. Other objects will be apparent during the course of the following description in which reference will be made to the drawings which form a part of this specification.

In general my invention contemplates a process for alkylating hydrocarbons in which, for example, an olefinic hydrocarbon and an isoparaffinic hydrocarbon are reacted in the presence of a fluent alkylation catalyst while flowing in a circuit of predetermined time capacity. The portion of the circuit during which the reactants and catalyst are maintained in heat exchange with the chilling means is substantially greater than in any other system heretofore known, the reactants passing longitudinally through an initial chilling stage and then having a net flow in the opposite direction but in a helical path about the chilling zone. If desired, the flow may be modified so as to effect the initial chilling while flowing the reactants in the helical path. Likewise one or more of the reactants may be introduced by tangential jets to enhance the helical flow of the reactants about the chilling zone.

In the drawing Figure 1 illustrates one modification of the apparatus partly in section;

Figure 2 is a cross-sectional view of the apparatus of Figure 1 taken along the line 2—2;

Figure 4 is another modification of the apparatus illustrated in Figure 1 also partly in section; and Figure 5 is a view of the deflector means taken along the line 5—5.

Figure 3:
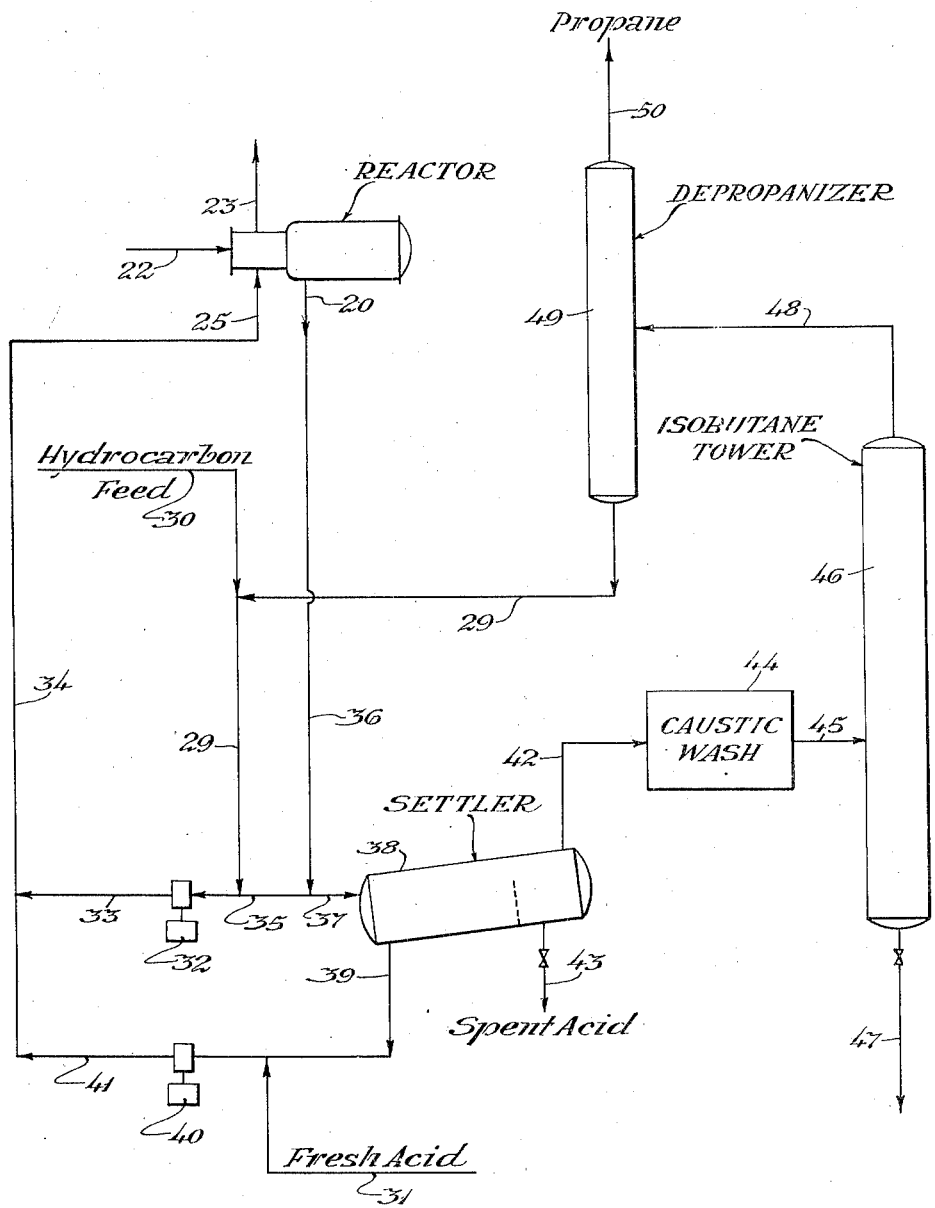
Figure 3 is a diagrammatic flow sheet showing the paths of streams flowing into and out of the contacting apparatus in accordance with illustrative modifications of operation.

The contactor comprises a horizontally elongated cylindrical vessel or drum 10. A horizontally disposed cylindrical partition 11 is mounted longitudinally within the vessel 10 and extends substantially the entire length thereof. The partition or inner shell 11 illustrated in Figures 1 and 4 is provided with end partitions 12 and 13 or 12 and 14, respectively. A bundle of tubes 17 is supported within the cylindrical partition 11 and a header 15 closed by header plate 16 is provided for the plurality of parallel tubes 17. The other end or back of the vessel 10 is provided with a removable closure 18 which comprises the turbohead or deflector 19. An inlet means 25 is provided for introducing the liquid phase mixture into the reaction zone, and a draw-off means 20 is provided for withdrawing the hydrocarbon-acid emulsion as described hereinafter. The annular space between the partition 11 and the vessel 10 is illustrated in Figure 4 as being provided with a helical baffle 21 which serves to direct the reacting mixture in a helical path about the cylindrical shell or partition 11. A similar baffle can be provided for the apparatus shown in Figure 1. Conduit means 22 passes through the header plate 16 and introduces the chilling fluid to the system at a point remote from the feed to the alkylation. An outlet 23 is provided for withdrawing the refrigerant or chilling medium. The partition 11 and its associated elements can be supported in such a manner as to permit its being withdrawn as a unit from vessel 10, for example on rollers or the like.

The apparatus illustrated in Figures 1 and 4 differ in the manner in which the reacting materials are contacted with the chilling means. In Figure 1 the reacting fluids or emulsion passes through the tubes 17 and the refrigerant is outside of the tubes 17. Thus the refrigerant is in direct heat exchange with both the walls of the tubes 17 and the partition 11.

In the modification of the apparatus illustrated in Figure 1, the liquid phase mixture of hydrocarbon feed, recycle emulsion and acid enter the inlet nozzle 25 on the tube bundle header 15 and then flows through the tubes 17 at a fairly high velocity effecting considerable dispersion of the reactants as the stream is discharged from the tubes 17 onto the turbo-head or deflector 19. After discharging from the tubes 17 the mixture flows onto vaned turbo-head 19 which causes the mixture to reverse its general direction of flow and to circulate in a helical motion between the shell or partition 11 and the wall of the vessel 10. The mixture passes in a helical path about the chiller 11 and ultimately the mixture is withdrawn by discharge outlet 20. By this means I provide a longer chilled path for the reactants and the helical motion within the chamber reduces the tendency for the acid to settle within the reactor.

In Figure 4 the reactants are circulated about the refrigerant tubes 17 and the cold reactant material refrigerates the shell or partition 11. The refrigerant enters nozzle 22 in the liquid phase and is directed through tubes 17 by means of the floating header 24. A suitable refrigerant is ammonia, a light hydrocarbon which may be one of the reactants, brine and the like can be used. The refrigerant in vapor or liquid or vapor and liquid phase passes through the tubes 17, header 15 and out through the discharge nozzle 23. The expanded refrigerant can be withdrawn and returned to a refrigerating system (not shown) for recompression and cooling before being returned to the chilling zone by means of nozzle 22. The liquid phase mixture of hydrocarbon feed, recycle emulsion and acid esters by means of inlet nozzle 25 and passes around the tubes 17 containing the refrigerant before discharging through the several jet-like openings 26 in partition 14. After discharging from the openings 26 the reaction mixture impinges upon the turbo-head 19 with the result that its direction of net flow is reversed and helical motion is imparted to the body of liquid as described above.

My invention finds particular utility in the production of iso-octane by the alkylation of isobutane with butylenes in the presence of strong sulfuric acid as the catalyst. Similar apparatus may be used in the alkylation of isobutane or other low boiling isoparaffins with propylenes or amylenes. Isoparaffinic and olefinic feeds may be introduced into the system separately or admixed. If desired, the isoparaffinic feed may have been prepared by passing through a feed preparation tower to remove any pentanes, etc., followed by caustic wash of the hydrocarbon. The mixture of recycle and feed isobutane and olefin is then introduced into the alkylation zone. The external or overall feed ratio of isoparaffin to olefin is maintained at about 4:1. However, by recycle the internal or reacting isoparaffin to olefin ratio is maintained at between about 100 and 150:1 or higher. The acid emulsion ordinarily is maintained at about 40 to 50% acid although higher and lower proportions can be used. Low temperatures such as between about 0 and 120° F., preferably between about 35 and 50° F. are desirable to obtain good yield and product quality. The reaction temperature ordinarily will be at about 40° F. with a maximum of about 50° F. for butylene alkylation and about 60° F. for amylenes when acid concentrations are between about 90 and 105%.

The alkylation feed enters the system through line 30 and passes into the contactor by way of nozzle 25. The catalyst which in the illustrated embodiment is strong sulfuric acid from any suitable source is introduced by line 31 and is pumped by pump 40 through lines 41 and 34 into the contactor along with the hydrocarbon feed. The mixed catalyst and reactants pass horizontally as shown by the arrows through the chilling zone. In issuing through the perforations 26 in header 14 or from the pipes 17, the acid-hydrocarbon mixture is subjected to high shearing stress, the perforations or pipe outlets providing a multiplicity of high velocity jets. High velocity discharge from the tubes 17 may be accomplished either by reducing the cross-sectional area of the tube or by reducing the flow area as by means of a needle. When the modification illustrated in Figure 4 is used the perforations 26 in plate 14 are designed to effect the desired degree of dispersion as, for example, by tapering the perforations to increase the turbulence in passing through the plate. The discharged material strikes the turbo-head or deflector 19 and the turbulence produced by the jets and the turbo-head is effective to maintain emulsification of the acid and hydrocarbons. The emulsion then flows in a helical path about the cooling zone to the other end of the contactor 10. The emulsified condition can be further enhanced by the continuous injection of additional quantities of hydrocarbons or catalysts, as for example, by means of tangential nozzles 51.

One or more tangential nozzles 51 may be provided for introducing stream or streams of olefin feed into the drum 10 in the direction of the motion of the emulsion within the drum and at longitudinally spaced points therein. The tangential injection will aid circulation of the emulsion within the drum 10 and will have a tendency to improve the alkylating conditions. If desired, different olefins may be added by the tangential nozzles. Thus, for example, in the alkylation with isobutane, propylene and butylene may be fed upstream and $C_5$ and $C_6$ olefins fed just prior to the withdrawal of the reactants from the contacting zone. Where a plurality of contacting chambers is used different olefins may be added to different contactors. It is also contemplated that catalyst be added by means of the tangential nozzles.

The effluent in line 36 from the reactor outlet 20 is split with about 20% of the hydrocarbon-acid emulsion being passed by line 37 into settler 38. The balance is recycled by pump 32 and lines 33 and 34 to the contactor. The acid being heavier than the hydrocarbons will quickly settle in separator 38 and is withdrawn therefrom by line 39 and recycled by pump 40 and lines 41 and 34 to the contactor. The acid strength is maintained above about 99%, spent acid being periodically or continuously withdrawn by valved line 43. Fresh acid introduced by line 31 can be added to the recycle emulsion in line 35 or to the recycle acid in line 39. The hydrocarbon fraction is withdrawn from settler 38 by line 42 and subjected to a caustic wash in a zone diagrammatically illustrated at 44. The alkylate and unreacted hydrocarbons are introduced by line 45 into isobutane tower 46. Normal butane and alkylate are withdrawn by bottom drawoff line 47, the unreacted hydrocarbons being withdrawn overhead by line 48 and introduced into depropanizer 49. Propane is withdrawn overhead by line 50 and isobutane recovered as bottoms from the depropanizer is recycled by line 29. Butane recovered from the alkylate by fractionating the bottoms withdrawn by lines 47 can be recycled to an isomerization step. An alternative product and recycle separation system may comprise means for first recovering a butane-free alkylate, and separate means for recovering a recycle isobutane fraction and a normal butane fraction.

The embodiments of my invention illustrated in the drawing include only one contactor, but it should be understood that a plurality of contactors may be used in series, in parallel, in series-parallel, or the like. The design of the described contactor is adaptable for use as a contactor requiring relatively short period contacting. However, it is also useful in the time-tank type of operation since the size of the contacting chamber around the chiller and the amount of constriction that is provided at the discharge end of the tubes 17 through which the feed mixture passes can be varied. Generally when a long period of contact is used little or no constriction would be provided while for the shorter time of contact which requires more intimate mixing, considerable constriction of the tubes should be provided in order to realize the mixing necessary for short time of contact.

The invention has been described with reference to strong sulfuric acid as the catalyst. It is contemplated, however, that other catalysts such as aluminum chloride complex or liquid hydrogen fluoride can be used. In general, process conditions can be adapted for the optimum use of the invention. Thus, when the alkylation is effected in the presence of an active aluminum halide catalyst, a temperature within the approximate range of 80 to 150° F., for example, about 100° F. is proposed. The mol ratio of isoparaffin to olefin introduced into the reactor will be greater than 4:1 and preferably greater than 6:1. The pressure within the alkylation zone should be sufficient to maintain liquid phase conditions and may be of the order of about 50 to 300, e. g. about 150 pounds per square inch. The space velocity may be approximately 0.4 to 4 volumes of liquid charge per hour per volume of complex. With high recycle of isoparaffin, however, the space velocity may be increased substantially, for example, between about 5 and 10 v./hr./v. If hydrogen fluoride is the alkylation catalyst, a temperature of between about 50 and 100° F., for example 85° F., can be used. Sufficient pressure should be applied to maintain the hydrogen fluoride in the liquid phase. A molar excess of isoparaffin to olefin is used and the mixture of hydrogen fluoride and hydrocarbon comprises at least 40 to 50%, preferably more than 100% hydrogen fluoride based upon the hydrocarbons.

It is contemplated that other modifications in my process and apparatus can be made by those skilled in the art without departing from the spirit of the invention. Therefore, although I have described in more or less detail specific examples embodying my invention it should be understood that the invention is not limited to the particular systems nor to any of the specific catalysts mentioned, the invention being defined by the appended claims.

I claim:

1. An apparatus for the alkylation of hydrocarbons with sulfuric acid which comprises a cylindrical vessel divided by a cylindrical baffle into inner and outer compartments, indirect cooling means within said inner compartment extending substantially the entire length of the inner compartment, a fluid inlet means for said inner compartment, means for discharging the fluid from said inner compartment into said outer compartment in a plurality of streams at a point remote from said inlet, a deflector means including vanes mounted within said cylindrical vessel opposite said fluid discharge means of the inner compartment and constructed and arranged to impart spiral motion to fluid issuing from said inner compartment, and a fluid outlet means at a low point in said vessel remote from said deflector means.

2. An apparatus comprising an outer vessel substantially horizontally disposed, means extending within said vessel for substantially the entire length of said vessel for dividing said vessel into an inner compartment and an annular outer compartment, a reaction fluid inlet means for said inner compartment, indirect cooling means extending substantially the entire length of said inner compartment, means for circulating a refrigerant through said cooling means, means for discharging the reaction fluid from said inner compartment in a plurality of streams, a deflector means including vanes mounted within said vessel opposite said fluid discharging means of the inner compartment and constructed and arranged to impart spiral motion to fluid issuing from said inner compartment, and a fluid outlet at a low point in the said vessel remote from said deflector means.

3. An apparatus comprising a vessel substantially horizontally disposed, a cylindrical partition extending longitudinally into said vessel thereby defining an outer compartment said cylindrical partition being closed at both ends and being provided with an inlet means and an outlet means remote from said inlet means for a heat exchange medium and an inner compartment, a plurality of parallel tubes within said inner compartment, header means exterior of said vessel communicating with said parallel tubes open ends of said tubes communicating with one end of said vessel, a fluid inlet means connected with said header, a deflector means including vanes at one end of said vessel opposite the discharge end of said tubes constructed and arranged to impart spiral motion to fluid issuing from said tubes, and outlet means at a low point in said vessel remote from the outlet of said plurality of parallel tubes.

4. An apparatus for the alkylation of hydrocarbons in the presence of a fluent catalyst which comprises a cylindrical outer vessel substantially horizontally disposed, a second cylindrical inner vessel extending longitudinally within said vessel, means for introducing reactants into said second vessel, a single means for indirectly cooling the vessels mounted within said inner vessel, means for withdrawing the reactants from said inner vessel in a plurality of streams at one end of said inner vessel, a deflector means including vanes mounted within the outer vessel opposite said reaction withdrawing means of the inner vessel and constructed and arranged to impart spiral motion to the reactants issuing from said inner vessel and fluid outlet means at a low point in said outer vessel remote from said deflector means.

5. The apparatus of claim 4 wherein means is provided for introducing additional amounts of reacting fluid into the outer vessel by means of tangential jets at longitudinally-spaced points.

6. The apparatus of claim 4 wherein a plurality of fluid outlets are provided along the bottom side of the outer vessel.

7. The apparatus of claim 4 wherein the cooling means comprises a plurality of parallel tubes through which the refrigerant flows and the reactants flow about the tubes.

8. An apparatus comprising a cylindrical vessel substantially horizontally disposed, a cylindrical partition extending longitudinally into said vessel thereby defining an outer compartment and an inner compartment, a plurality of parallel tubes within said inner compartment, means at each end of said cylindrical partition for supporting said parallel tubes and for closing the ends of said partition, a header means exterior of said vessel communicating with one end of said parallel tubes, a fluid inlet means connected with said header, a deflector means including a plurality of vanes integral with one end of said vessel opposite the discharge end of said tubes and constructed and arranged both to reverse the general direction of flow through said vessel of the fluid issuing from said tubes and to impart spiral motion to the fluid, conduit means extending through said header to the remote end of said inner compartment for supplying cooling fluid thereto, cooling fluid outlet means associated with said inner compartment and outlet means communicating with the outer compartment at a low point in said vessel remote from the discharge end of said plurality of parallel tubes.

9. An apparatus for alkylating in liquid phase reactants including hydrocarbons and catalyst comprising an elongated cylindrical vessel, a cylindrical conduit means extending longitudinally into said vessel for substantially the entire length thereof thereby defining an elongated annular space between said conduit and said vessel, means for closing the outside end of said conduit means, an inlet for introducing reactants into said conduit at the outer end thereof, means for discharging reactants from said conduit into said vessel in a plurality of substantially axially flowing streams, means defining a confined passageway for the flow of cooling liquid within said conduit means, means including vanes mounted within said vessel opposite said discharging means in the path of the discharged streams whereby the discharged reactants are deflected rearwardly and caused to flow through the annular space in a stream transverse-countercurrently to the flow of reactants in said conduit, and means for withdrawing said reactants from said vessel at the end of the annular space adjacent the inlet means to said conduit.

10. An apparatus for alkylating in liquid phase reactants including hydrocarbons and catalyst comprising an elongated cylindrical vessel, a cylindrical conduit means extending longitudinally into said vessel for substantially the entire length thereof thereby defining an elongated annular space between said conduit and said vessel, means for closing the outside end of said conduit means, an inlet for introducing reactants into said conduit at the outer end thereof, means including a plurality of tubes within said conduit extending from said inlet means through said inner chamber for discharging reactants from said conduit into said vessel in a plurality of substantially axially flowing streams, a partition in said conduit supporting said tubes and serving to close said conduit, means for defining a confined passageway for the flow of cooling liquid within said conduit means, a deflector means including vanes mounted within the vessel opposite the discharge end of said tubes and constructed and arranged to impart spiral motion to fluid issuing from said tubes and means for withdrawing said reactants from said vessel at the end of the annular space adjacent the inlet means to said conduit.

11. An apparatus for alkylating in liquid phase reactants including hydrocarbons and catalyst comprising an elongated cylindrical vessel, a cylindrical conduit means extending longitudinally into said vessel for substantially the entire length thereof thereby defining an elongated annular space between said conduit and said vessel, means for closing the outside end of said conduit, an inlet for introducing reactants into said conduit at the outer end thereof, means including a plurality of tubes within said conduit extending from said inlet means through said inner chamber for discharging reactants from said conduit into said vessel in a plurality of substantially axially flowing streams, cooling means for said conduit, said cooling means comprising at least two partitions in said conduit serving to support said tubes and forming therebetween a liquid-type chamber, inlet and outlet means to said chamber for heat exchange medium, said inlet being adjacent the discharged end of said tubes and said outlet being oppositely disposed to said inlet, a deflector means including vanes mounted within the vessel opposite the discharge end of said tubes and constructed and arranged to impart spiral motion to fluid issuing from said tubes, and means for withdrawing said reactants from said vessel at the end of the annular space adjacent the inlet means to said conduit.

EDGAR J. LUETZELSCHWAB.

REFERENCES CITED

The following references are of record in the file of this patent:

UNITED STATES PATENTS

| Number | Name | Date |
|---|---|---|
| 457,078 | Dean | Aug. 4, 1891 |
| 965,822 | Kestner | July 26, 1910 |
| 1,226,379 | Riley | May 15, 1917 |
| 1,794,336 | Jacocks | Feb. 24, 1931 |
| 1,816,528 | Haysel | July 28, 1931 |
| 1,960,770 | Brown | May 29, 1934 |
| 2,060,936 | Haag, Jr. | Nov. 17, 1936 |
| 2,220,092 | Evering | Nov. 5, 1940 |
| 2,238,802 | Altshuler | Apr. 15, 1941 |
| 2,246,703 | Thiele | June 24, 1941 |
| 2,266,019 | Frey | Dec. 16, 1941 |
| 2,322,482 | Stahly | June 22, 1943 |

OTHER REFERENCES

The Refiner; Stratco Alkylation Contactor, vol. 21, No. 6, (June 1942) page 37.